US009111195B2

(12) United States Patent
Aoki et al.

(10) Patent No.: US 9,111,195 B2
(45) Date of Patent: Aug. 18, 2015

(54) ANTENNA, SEMICONDUCTOR DEVICE, AND METHOD OF MANUFACTURING ANTENNA

(71) Applicant: Semiconductor Energy Laboratory Co., Ltd., Atsugi-shi, Kanagawa-ken (JP)

(72) Inventors: Tomoyuki Aoki, Tochigi (JP); Susumu Sekiguchi, Tochigi, PA (US); Shingo Eguchi, Tochigi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 0 days.

(21) Appl. No.: 13/958,816

(22) Filed: Aug. 5, 2013

(65) Prior Publication Data

US 2013/0313329 A1    Nov. 28, 2013

Related U.S. Application Data

(62) Division of application No. 13/157,645, filed on Jun. 10, 2011, now Pat. No. 8,528,827.

(30) Foreign Application Priority Data

Jun. 18, 2010    (JP) ................. 2010-139426

(51) Int. Cl.
*G06K 19/00* (2006.01)
*G06K 19/077* (2006.01)
*H01Q 1/22* (2006.01)
*H01Q 7/00* (2006.01)
(Continued)

(52) U.S. Cl.
CPC ........ *G06K 19/07794* (2013.01); *G06K 19/077* (2013.01); *G06K 19/07773* (2013.01); *H01Q 1/2225* (2013.01); *H01Q 7/00* (2013.01); *H01F 5/003* (2013.01); *H01F 41/041* (2013.01); *Y10T 29/49016* (2015.01); *Y10T 29/49018* (2015.01)

(58) Field of Classification Search
USPC .................................................. 235/487, 492
See application file for complete search history.

(56) References Cited

U.S. PATENT DOCUMENTS

| 8,178,958 B2 | 5/2012 | Ito et al. |
| 8,232,880 B2 | 7/2012 | Yamazaki et al. |

(Continued)

FOREIGN PATENT DOCUMENTS

| JP | 10-069533 A | 3/1998 |
| JP | 2002-042083 A | 2/2002 |

(Continued)

*Primary Examiner* — Matthew Mikels
(74) *Attorney, Agent, or Firm* — Eric J. Robinson; Robinson Intellectual Property Law Office, P.C.

(57) ABSTRACT

In an antenna and a semiconductor device including the antenna, an object is to reduce the distance between electrodes of a capacitor as much as possible, reduce the area of the electrode of the capacitor as much as possible, and prevent the suppression of response sensitivity and a response range of the semiconductor device. The present invention relates to an antenna including an antenna coil provided over a first region of a base and a capacitor which uses a second region of the base as a dielectric body and which has electrodes provided for opposite planes of the second region of the base, wherein the second region of the base is thinner than the first region of the base, and also relates to a semiconductor device including the antenna.

17 Claims, 6 Drawing Sheets

(51) Int. Cl.
*H01F 5/00* (2006.01)
*H01F 41/04* (2006.01)

(56) References Cited

U.S. PATENT DOCUMENTS

| | | |
|---|---|---|
| 2002/0113736 A1 | 8/2002 | Toutain et al. |
| 2002/0190132 A1 | 12/2002 | Kayanakis |
| 2004/0245347 A1* | 12/2004 | Shibamoto et al. ........... 235/492 |
| 2005/0218806 A1 | 10/2005 | Sawa et al. |
| 2007/0229279 A1 | 10/2007 | Yamazaki et al. |
| 2007/0268113 A1* | 11/2007 | Johnson ........................ 340/10.1 |
| 2008/0217761 A1 | 9/2008 | Yang et al. |
| 2009/0195386 A1 | 8/2009 | Peter et al. |
| 2012/0241924 A1 | 9/2012 | Ito et al. |

FOREIGN PATENT DOCUMENTS

| | | |
|---|---|---|
| JP | 2004-116766 A | 4/2004 |
| JP | 2005-025514 A | 1/2005 |
| JP | 2005-032901 A | 2/2005 |
| JP | 2005-243855 A | 9/2005 |
| JP | 2006-042097 A | 2/2006 |
| JP | 2006-146890 A | 6/2006 |
| JP | 2007-272879 A | 10/2007 |
| JP | 2007-306601 A | 11/2007 |
| JP | 2007-324426 A | 12/2007 |
| JP | 2008-003681 A | 1/2008 |
| JP | 2008-226070 A | 9/2008 |
| WO | WO-2006/043685 | 4/2006 |

* cited by examiner

ANTENNA, SEMICONDUCTOR DEVICE, AND METHOD OF MANUFACTURING ANTENNA

BACKGROUND OF THE INVENTION

1. Field of the Invention

An aspect of the present invention to be disclosed relates to a semiconductor device having a wireless communication function (also referred to as an ID tag).

2. Description of the Related Art

In recent years, an RFID system where data are exchanged between an ID tag (also referred to as an RFID tag, an IC tag, an electronic tag, or a wireless tag) and a reader/writer (or a reader) has been popular. Since data are exchanged using an antenna provided for each of an ID tag and a reader/writer in this RFID system, communication is possible even when the ID tag is set apart from the reader/writer by several centimeters to several meters. Moreover, due to an advantage of high resistance against dust, static electricity, and the like, the RFID system has come to be used for a variety of fields including production management in factories, logistics, access control, and the like.

In a case of data communication in this RFID system, the resonant frequency of the antennas of both the ID tag and the reader/writer needs to correspond to the transmitted carrier frequency with a certain degree of accuracy. Here, the resonant frequency f of the antenna is expressed by the following Formula (1) where L is the inductance of an antenna coil and C is the capacitance of a capacitor.

$$f = 1/2\pi\sqrt{(LC)} \quad \text{(Formula 1)}$$

According to Formula 1, the resonant frequency f can be adjusted to a desired value by increasing or decreasing the inductance L of the antenna coil or the capacitance C of the capacitor (see Patent Document 1).

On the contrary, in a case where the resonant frequency f is determined in advance, the product of the inductance L of the antenna coil and the capacitance C of the capacitor needs to be set at a certain value.

The inductance L is proportional to the square of the number of windings of the coil $N_L$ and the cross-sectional area thereof $S_L$, and is inversely proportional to the length $d_L$ of the coil in its axial direction. In other words, it can be said that the inductance L largely depends on the number of windings of the coil $N_L$. However, once the area of the ID tag is determined, the area occupied by the antenna coil is also determined. That is to say, when the area occupied by the antenna coil is determined, the number of windings of the coil $N_L$ is also determined necessarily. Therefore, it is difficult to adjust the resonant frequency f to a desired value by the number of windings of the coil $N_L$.

Meanwhile, the capacitance C of the capacitor is proportional to the area $S_C$ of an electrode, and is inversely proportional to the distance $d_C$ between the electrodes.

As the capacitor of the ID tag, for example, a parallel-plate capacitor in which each of a top surface and a bottom surface of a dielectric body is provided with an electrode formed using a parallel-plate conductive material is given (see Patent Document 2).

REFERENCES

[Patent Document 1] Japanese Published Patent Application No. 2007-306601

[Patent Document 2] Japanese Published Patent Application No. 2002-42083

SUMMARY OF THE INVENTION

A conductive material used for an electrode of a capacitor causes an interruption of an electromagnetic wave including a signal transmitted from a reader/writer. Therefore, when the electrode of the capacitor has a large area, the electromagnetic wave is interrupted so as to cause the suppression of response sensitivity or a response range of a semiconductor device. Accordingly, the area of the electrode of the capacitor needs to be reduced as much as possible.

As described above, the capacitance C of the capacitor is proportional to the area $S_C$ of the electrode and is inversely proportional to the distance $d_C$ between the electrodes. That is to say, in a case of forming a semiconductor device with a desired resonant frequency f, in order to reduce the area $S_C$ of the electrode of the capacitor, the distance $d_C$ between the electrodes also needs to be reduced.

In view of the aforementioned, it is an object of an aspect of the present invention to be disclosed to reduce the distance between the electrodes of the capacitor as much as possible.

It is an aspect of the present invention to be disclosed to reduce the area of the electrode of the capacitor as much as possible.

It is an aspect of the present invention to be disclosed to prevent the suppression of response sensitivity and a response range of a semiconductor device.

In an aspect of the present invention to be disclosed, the thickness of a dielectric body of the capacitor is reduced. This allows the distance between the electrodes of the capacitor to be reduced.

An aspect of the present invention to be disclosed is an antenna including an antenna coil provided over a first region of a base, and a capacitor which uses a second region of the base as a dielectric body and which has electrodes provided for opposite planes of the second region of the base, wherein the second region of the base is thinner than the first region of the base.

An aspect of the present invention to be disclosed is a semiconductor device including a first antenna coil provided over a first region of a base, a capacitor which uses a second region of the base as a dielectric body and which has electrodes provided for opposite planes of the second region of the base, and a chip including a semiconductor integrated circuit and a second antenna coil, wherein the second region of the base is thinner than the first region of the base.

An aspect of the present invention to be disclosed is a method of manufacturing an antenna including an antenna coil and a capacitor, which includes the steps of rotating a roller having a projection portion while pressing the roller onto a base with a first thickness, providing the base with a dielectric body of the capacitor having a second thickness smaller than the first thickness by pressing the projection portion onto a first plane of the base, providing the base with an opening, forming a first conductive material over a first plane of a region with the second thickness, inside the opening, and over the first plane of the base, forming a second conductive material over the first plane of the base and a second plane thereof on an opposite side, and heating the first conductive material and the second conductive material so as to form the antenna coil and an electrode of the capacitor.

In an aspect of the present invention to be disclosed, the base is a film containing any of polyethylene terephthalate, polyethylene naphthalate, polyether sulfone, and polyimide.

In an aspect of the present invention to be disclosed, each of the first conductive material and the second conductive material includes at least one of silver (Ag), gold (Au), copper (Cu), nickel (Ni), platinum (Pt), palladium (Pd), tantalum (Ta), molybdenum (Mo), and titanium (Ti).

In an aspect of the present invention to be disclosed, the distance between the electrodes of the capacitor can be reduced by reducing the thickness of the dielectric body of the capacitor. By reducing the distance between the electrodes of the capacitor, the area of the electrode of the capacitor can be reduced. The reduction in the area of the electrode of the capacitor leads to the prevention of the suppression of response sensitivity and a response range of a semiconductor device.

DETAILED DESCRIPTION OF THE INVENTION

Figure 1A:
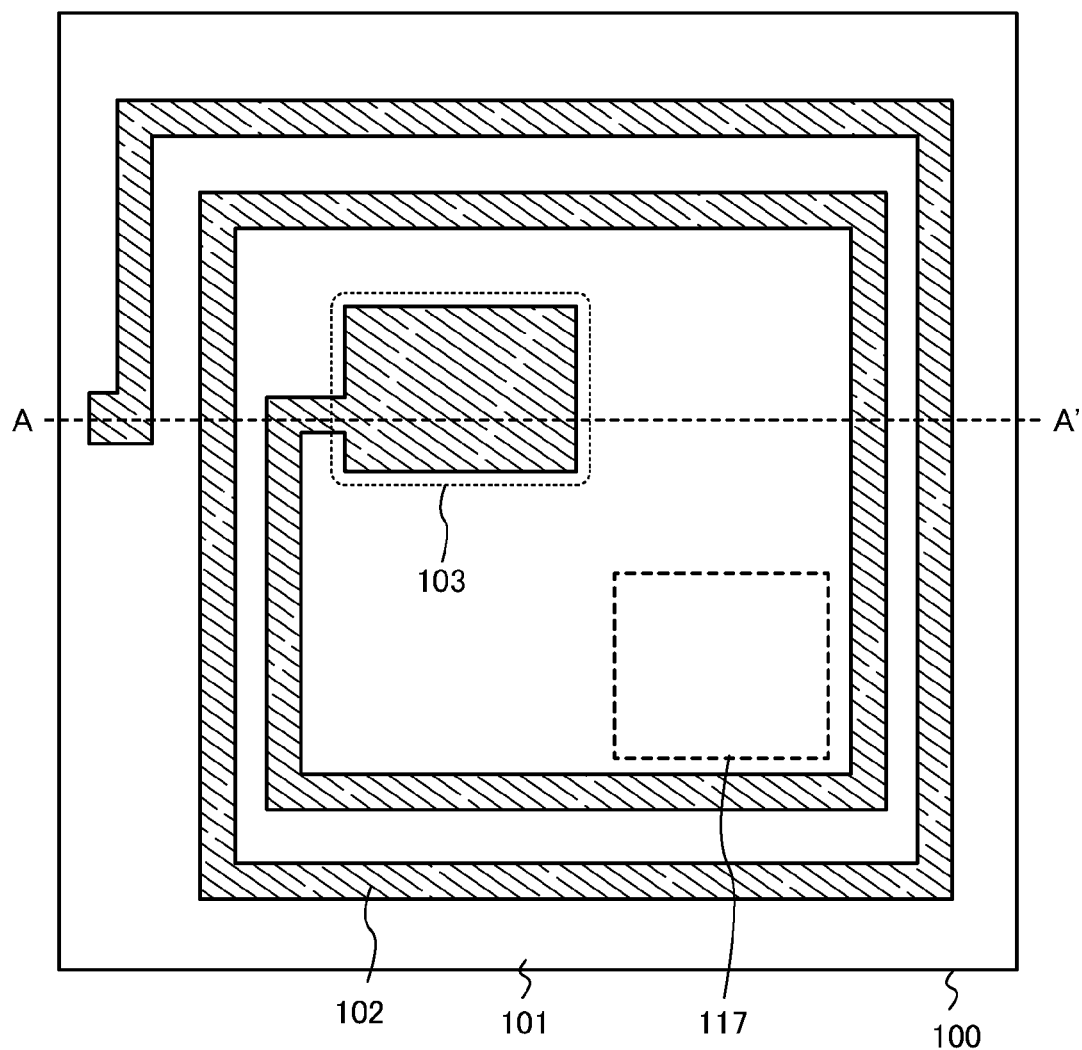
FIGS. 1A and 1B are a top view and a cross-sectional view of a semiconductor device, respectively.

Embodiment of the present invention disclosed in this specification will be hereinafter described with reference to the accompanying drawings. Note that the invention disclosed in this specification can be carried out in a variety of different modes, and it is easily understood by those skilled in the art that the modes and details of the invention disclosed in this specification can be changed in various ways without departing from the spirit and scope thereof. Therefore, the present invention is not construed as being limited to description of the Embodiment. Note that, in the drawings hereinafter shown, the same portions or portions having similar functions are denoted by the same reference numerals, and repeated description thereof will be omitted.

This Embodiment is explained with reference to FIGS. 1A and 1B, FIGS. 2A to 2C, FIGS. 3A to 3C, FIGS. 4A to 4C, FIGS. 5A to 5C, and FIG. 6.

Figure 1B:
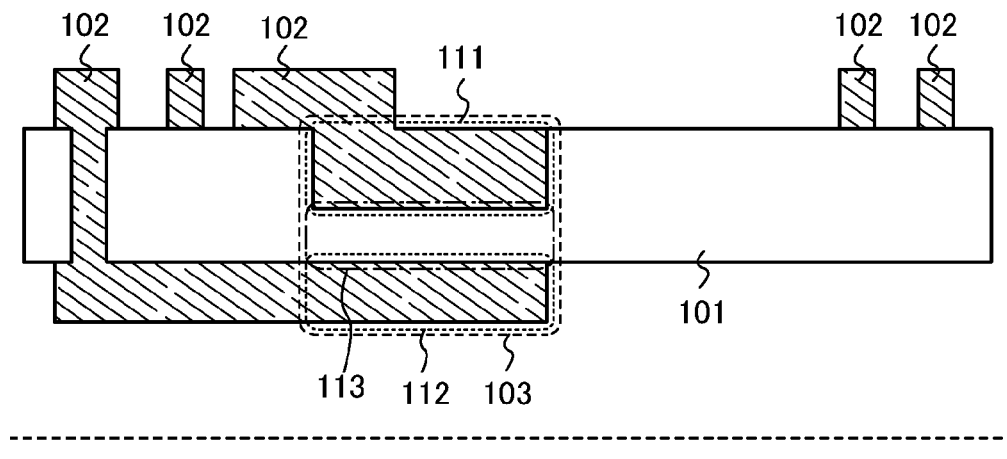

FIG. 1A is a top view of a semiconductor device 100, and FIG. 1B is a cross-sectional view along A-A' of FIG. 1A. The semiconductor device 100 shown in FIGS. 1A and 1B includes a base 101 having a first thickness, an antenna including an antenna coil 102 and a capacitor 103, and a semiconductor integrated circuit chip 117. The capacitor 103 includes as a dielectric body a region 113 which corresponds to a part of the base 101. The opposite planes of the region 113 are provided with an electrode 111 and an electrode 112 of the capacitor 103. The antenna coil 102 is provided over the base 101 and is electrically connected to the capacitor 103. The semiconductor integrated circuit chip 117 is a circuit formed using a semiconductor substrate or a circuit formed using a semiconductor thin film.

In FIG. 1B, the antenna coil 102, and the electrode 111 and the electrode 112 of the capacitor 103 correspond to one continuous conductive layer. However, regions provided for the opposite planes of the dielectric body (the region 113 corresponding to a part of the base 101) in the conductive layer function as the electrodes (the electrode 111 and the electrode 112) of the capacitor 103. Further, a region of the conductive layer which does not overlap with the dielectric body functions as the antenna coil 102.

A second thickness, which corresponds to the thickness of the dielectric body of the capacitor 103, i.e., the region 113 of the base 101, is smaller than the first thickness corresponding to the thickness of the region of the base 101 where the antenna coil 102 is formed. By reducing the thickness of the dielectric body of the capacitor 103, the distance between the electrode 111 and the electrode 112 of the capacitor 103 can be reduced. By reducing the distance between the electrode 111 and the electrode 112 of the capacitor 103, the areas of the electrode 111 and the electrode 112 of the capacitor 103 can be reduced. The reduction in the area of each of the electrode 111 and the electrode 112 of the capacitor 103 leads to the prevention of the suppression of response sensitivity and a response range of the semiconductor device 100.

As the base 101, for example, a flexible film of polyethylene naphthalate (PEN), polyethylene terephthalate (PET), polyether sulfone (PES), polyimide (PI), or the like can be used.

The first thickness corresponding to the thickness of the region of the base 101 where the antenna coil 102 is formed is preferably 1 μm or more and 300 μm or less, more preferably 1 μm or more and 50 μm or less. When the base 101 with such a thickness is used, the semiconductor device 100 can be manufactured so as to be thin and capable of being bent.

The second thickness corresponding to the thickness of the region 113 of the base 101 (the dielectric body of the capacitor 103), i.e., the distance $d_C$ between the electrode 111 and the electrode 112 of the capacitor 103 may be determined based on the resonant frequency f of the antenna and the number of windings of the coil $N_L$.

In this Embodiment, a polyethylene naphthalate film with a thickness of 25 μm is used as the base 101.

Each of the antenna coil 102, and the electrode 111 and the electrode 112 of the capacitor 103 may be formed of a conductive material including at least one metal element of silver (Ag), gold (Au), copper (Cu), nickel (Ni), platinum (Pt), palladium (Pd), tantalum (Ta), molybdenum (Mo), and titanium (Ti).

Figure 6:
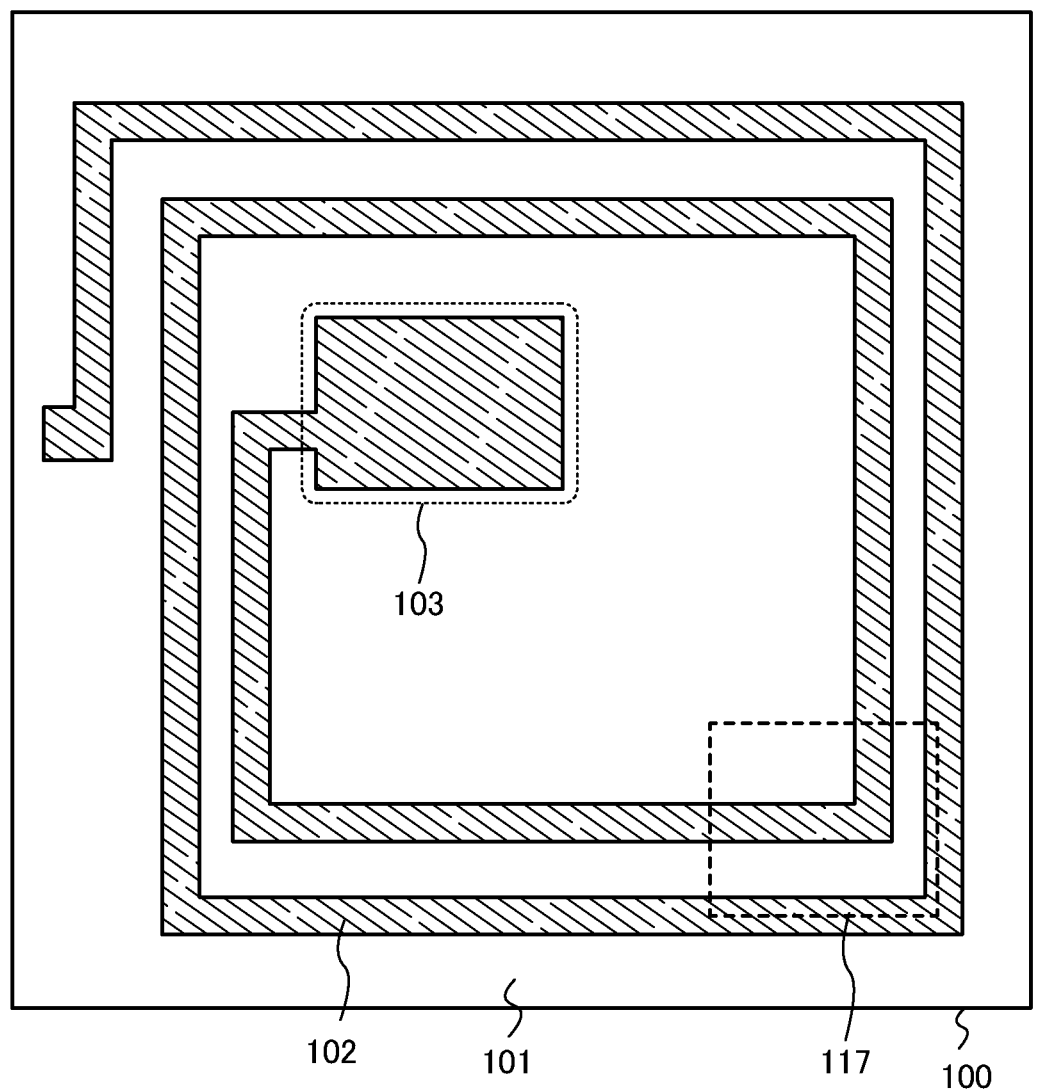
FIG. 6 is a top view of a semiconductor device.

In FIG. 1A, the semiconductor integrated circuit chip 117 is disposed so as not to overlap with the antenna coil 102; however, the semiconductor integrated circuit chip 117 may be disposed so as to overlap with the antenna coil 102 as shown in FIG. 6.

A method of manufacturing the semiconductor device 100 of this Embodiment is described below.

Figure 2A:
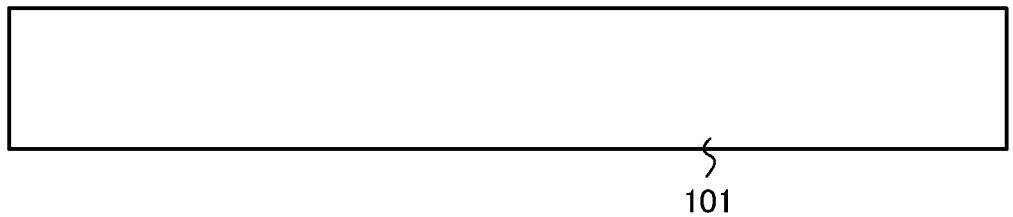
FIGS. 2A to 2C are cross-sectional views illustrating a manufacturing process of a semiconductor device.
Figure 2B:
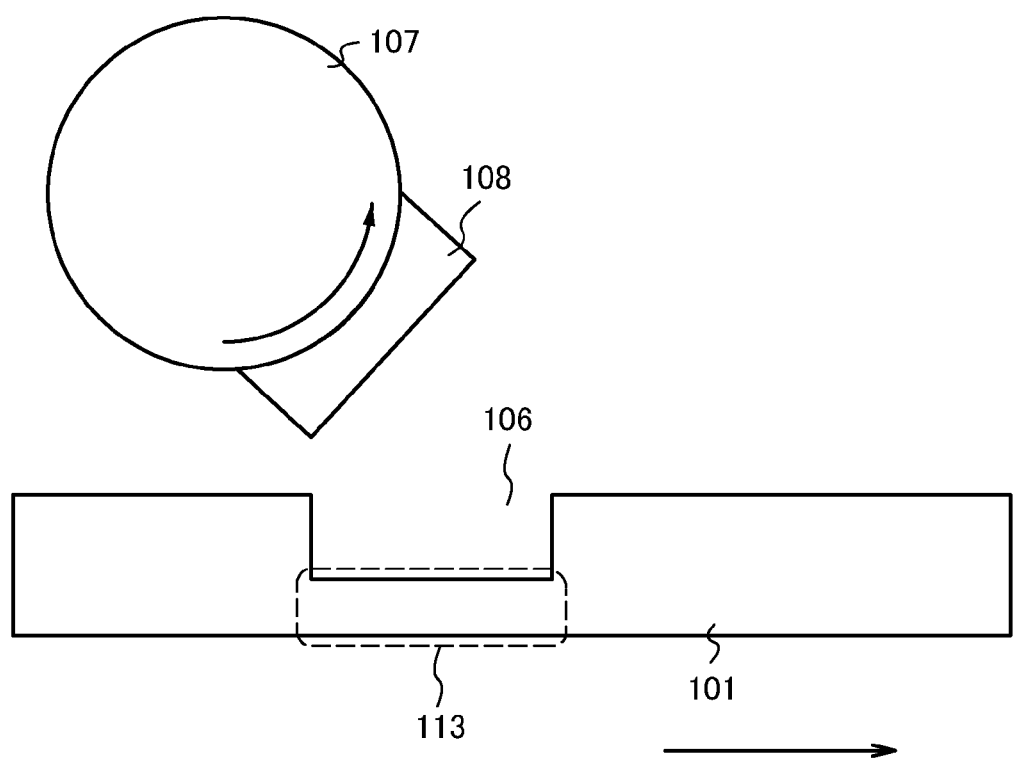

First, the base 101 having the first thickness is prepared (see FIG. 2A).

Next, a roller 107 having a projection portion 108 is rotated while being pressed onto the base 101, so that the projection portion 108 is pressed onto a first plane of the base 101. Accordingly, the base 101 is provided with a depression portion 106 (see FIG. 2B). The region 113 of the base 101 where the depression portion 106 is formed has reduced thickness. The region 113 of the base 101 with the reduced thickness serves as the dielectric body of the capacitor 103. Note that the thickness of the base in the region with the reduced thickness corresponds to the second thickness. Note that the depression portion 106 may be formed by irradiation with a laser beam instead of using the roller 107 having the projection portion 108.

Figure 2C:
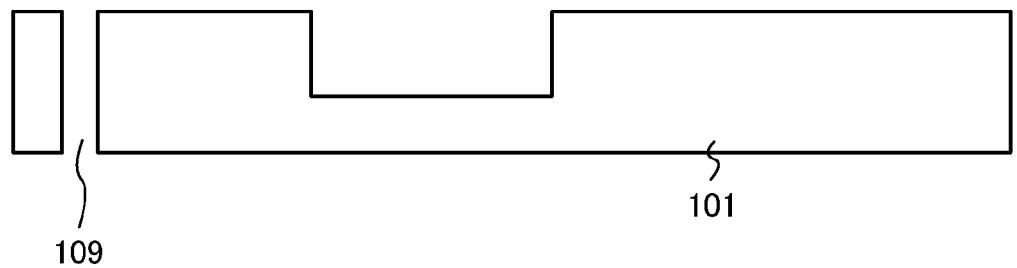

Next, the base 101 is provided with an opening 109 (see FIG. 2C). The opening 109 is formed by irradiation with a laser beam having a wavelength which is absorbed by the base 101. Typically, a laser beam of an ultraviolet region, a visible region, or an infrared region is selected as appropriate for the irradiation.

As a laser oscillator which can deliver the aforementioned laser beam, an excimer laser oscillator such as a KrF oscillator, an ArF oscillator, or an XeCl laser is given. Alternatively, as the laser oscillator, a gas laser oscillator including gas such as He, He—Cd, Ar, He—Ne, HF, or $CO_2$ is given. Further, as the laser oscillator, a solid-state laser oscillator including a crystal such as YAG, $GdVO_4$, $YVO_4$, YLF, $YAlO_3$, or the like doped with Cr, Nd, Er, Ho, Ce, Co, Ti, or Tm, or a solid-state laser oscillator including glass, ruby, or the like is given. In the case of using the solid-state laser oscillator, it is preferable to use any of the fundamental wave to the fifth harmonic as appropriate. Further alternatively, a semiconductor laser oscillator including GaN, GaAs, GaAlAs, InGaAsP, or the like can be used.

In this Embodiment, the base 101 is irradiated with a UV laser beam with a wavelength of 266 nm, whereby the opening 109 having a circular shape with a diameter of 50 μm when seen from above is formed. The opening 109 is formed with respect to the first plane of the base 101 provided with the depression portion 106 and a second plane thereof on the side opposite to the first plane. The shape of the opening 109 does not have to be circular but may be triangular or rectangular. The width of the cross section of the opening can be determined as appropriate. The number of the openings 109 may be one or two or more. The shape and the number of the openings 109 may be determined as appropriate so that conductive materials formed for the opposite planes of the base 101 are electrically connected to each other favorably through the opening.

The opening 109 may be formed by a punch press process using metallic molding or by a cutter knife or the like.

Figure 3A:
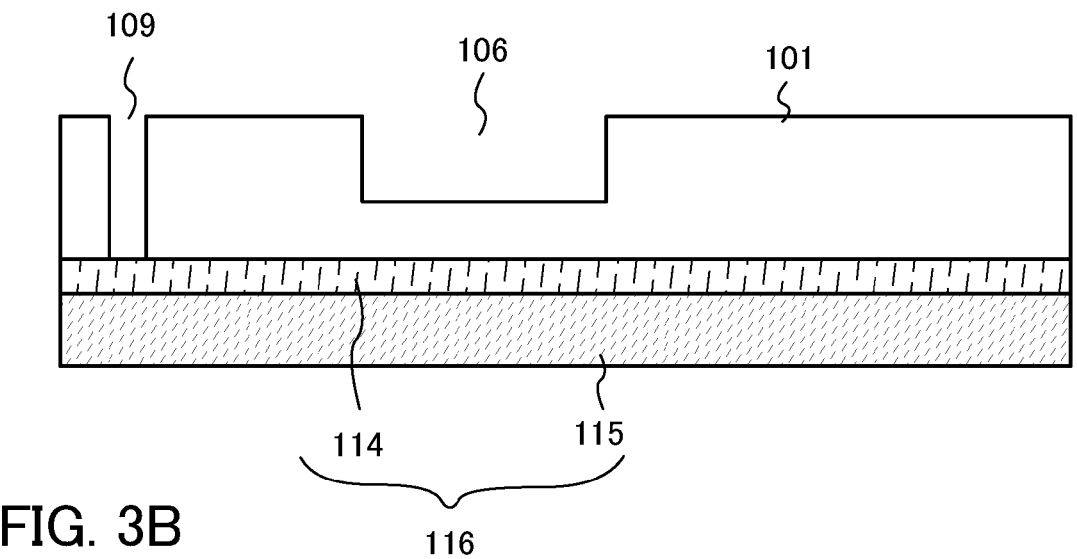
FIGS. 3A to 3C are cross-sectional views illustrating a manufacturing process of a semiconductor device.

A supporting base 116 having a base 115 and an adhesive 114 is attached to the second plane of the base 101 by a mechanical or manual means (see FIG. 3A).

Figure 3B:
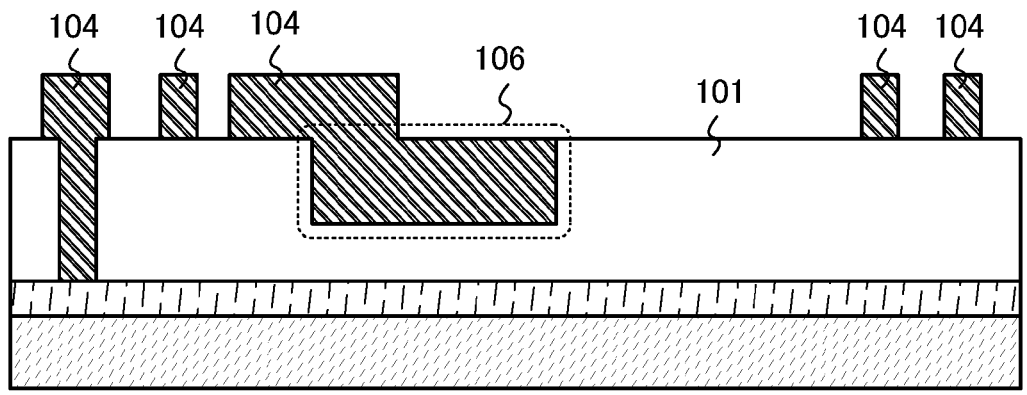
Figure 3C:
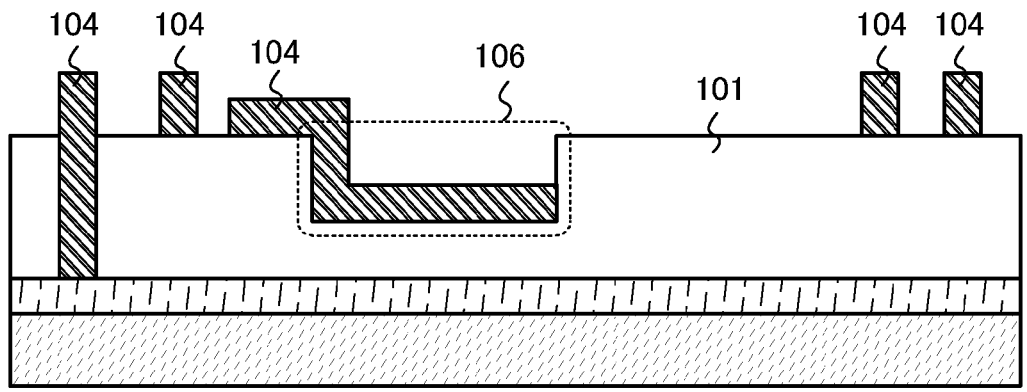

Next, a conductive material 104 is formed inside the depression portion 106, inside the opening 109, and over the first plane of the base 101 (see FIG. 3B). Note that the inside of the depression portion 106 is filled with the conductive material 104 in FIG. 3B; however, as shown in FIG. 3C, the inside of the depression portion 106 does not have to be filled with the conductive material 104.

As the conductive material 104, a material including a conductive particle and an organic resin is used. Specifically, a conductive paste in which conductive particles each having a diameter of several nanometers to several tens of micrometers are dissolved or dispersed in an organic resin is used. As the conductive particle, a dispersive nanoparticle, a microparticle of silver halide, or a metal particle of one or more of silver (Ag), gold (Au), copper (Cu), nickel (Ni), platinum (Pt), palladium (Pd), tantalum (Ta), molybdenum (Mo), titanium (Ti), and the like can be used. In addition, as the organic resin included in the conductive paste, one or more organic resins selected from among organic resins which serve as a binder, a solvent, a dispersing agent, and a coating material for the metal particle can be used. Organic resins such as an epoxy resin and a silicone resin are typically given. Further, in forming the conductive layer, baking is preferably performed after the conductive paste is extruded.

The conductive material 104 can be formed by a screen printing method, a gravure printing method, an inkjet printing method, a rotary screen printing method, or the like.

In this Embodiment, a silver paste is formed as the conductive material 104 by a screen printing method.

After the formation of the conductive material 104, a first heating step is performed. The first heating step is performed for hardening the organic resin included in the conductive material 104. In this Embodiment, the first heating step is performed for 10 minutes at 90° C. Note that the first heating step is performed in order to prevent the peeling of the conductive material 104 in a later step of forming a conductive material 110 over the second plane of the base 101. Therefore, if there is no risk of the peeling of the conductive material 104, the first heating step does not have to be performed.

Figure 4A:
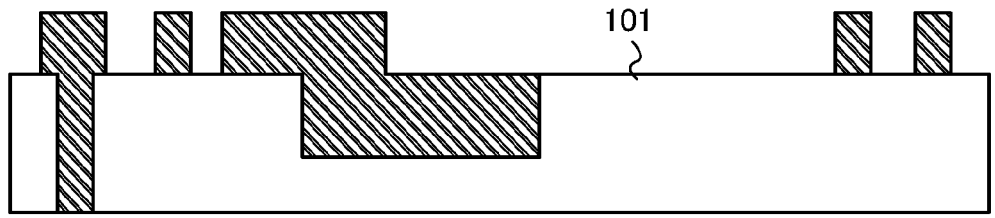
FIGS. 4A to 4C are cross-sectional views illustrating a manufacturing process of a semiconductor device.

Next, the supporting base 116 having the base 115 and the adhesive 114 is separated from the second plane of the base 101 (see FIG. 4A).

Figure 4B:
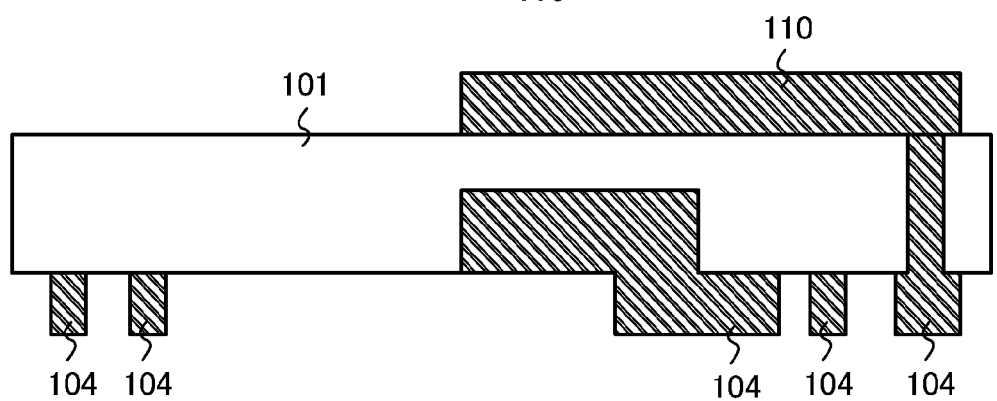

After the separation of the supporting base 116, the conductive material 110 is formed over the second plane of the base 101 (see FIG. 4B). The conductive material 110 may be either the same as or different from the conductive material 104. However, the conductive material 110 is formed in contact with the conductive material 104 formed in the opening 109. Note that a method for forming the conductive material 110 can be the same as a method for forming the conductive material 104.

Next, a second heating step is performed so as to remove the organic resin included in the conductive material 104 and the conductive material 110, whereby the resistance of the conductive material 104 and the conductive material 110 is reduced. In the aforementioned manner, the antenna coil 102, and the electrode 111 and the electrode 112 of the capacitor 103 are formed using the conductive material 104 and the conductive material 110.

Note that in FIG. 4B, the conductive material 104 in the opening 109 and the conductive material 110 formed over the second plane of the base 101 are illustrated to be continuous. In the case where the conductive material 104 and the conductive material 110 are formed using the same material, the conductive material 104 and the conductive material 110 are continuous. In the case where the conductive material 104 and the conductive material 110 are formed using different materials from each other, the conductive material 104 and the conductive material 110 are not necessarily continuous. As long as the conductive material 104 in the opening 109 and the conductive material 110 formed over the second plane of the base 101 function as the antenna coil 102 and the electrode 112, and the conductive material 104 and the conductive material 110 are electrically connected to each other, they may be either continuous or discontinuous.

Figure 4C:
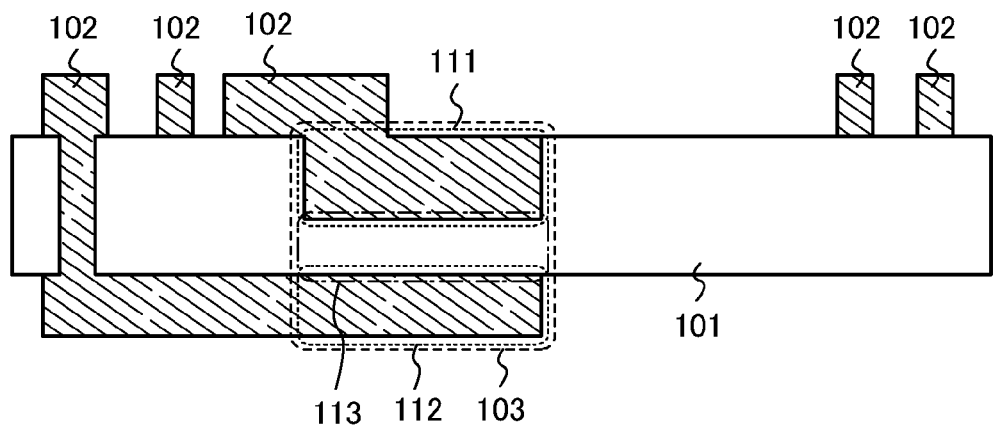

In this manner, the antenna coil 102 and the capacitor 103 are provided for the base 101 (see FIG. 4C). Note that FIG. 4C corresponds to FIG. 1B.

As shown in FIG. 1A, the semiconductor device 100 includes the semiconductor integrated circuit chip 117 provided with the antenna (also referred to as an on-chip antenna), and the base 101 provided with the antenna coil 102 (also referred to as a booster antenna) and the capacitor 103.

A semiconductor integrated circuit provided in the semiconductor integrated circuit chip 117 includes a plurality of elements such as a transistor which forms a memory portion or a logic portion. As the transistor which forms the memory portion or the logic portion, a field effect transistor is given. Further, a storage element in the memory portion may be formed with the use of the field effect transistor.

Figure 5A:
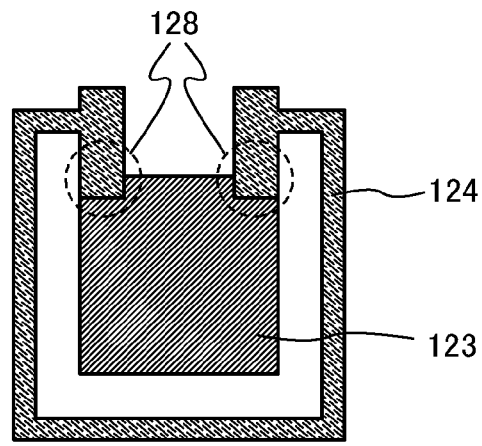
FIGS. 5A and 5B are top views of semiconductor devices and FIG. 5C is a block diagram thereof.

FIG. 5A is an expanded view of an antenna coil 124 (on-chip antenna) and a semiconductor integrated circuit 123 included in the semiconductor integrated circuit chip 117 shown in FIG. 1A.

In FIG. 5A, the antenna coil 124 is a rectangular loop antenna with one winding; however, one embodiment of the present invention is not limited to this structure. The shape of the loop antenna is not limited to a rectangle and may be a shape with a curve line, e.g., a circular shape. In addition, the number of windings is not limited to one and may be plural. When the number of windings of the antenna coil 124 is 1, the parasitic capacitance generated between the semiconductor integrated circuit 123 and the antenna coil 124 can be reduced.

In FIG. 5A, the antenna coil 124 is placed to surround the periphery of the semiconductor integrated circuit 123, and except for portions corresponding to power feeding points 128 illustrated by dashed lines, the antenna coil 124 is arranged in a region different from the semiconductor integrated circuit 123.

Figure 5B:
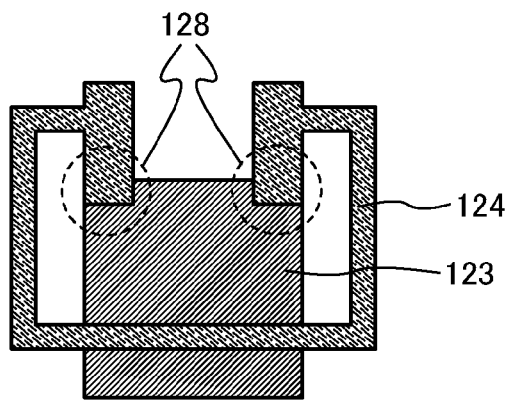

However, one embodiment of the present invention is not limited to the structure shown in FIG. 5A; as illustrated in FIG. 5B, the antenna coil 124 may be arranged so as to at least partly overlap with the semiconductor integrated circuit 123 in addition to the portions corresponding to the power feeding points 128 indicated by the dashed lines.

Note that in the case where the antenna coil 124 is arranged in a region different from the semiconductor integrated circuit 123 as illustrated in FIG. 5A, the parasitic capacitance generated between the semiconductor integrated circuit 123 and the antenna coil 124 can be reduced.

Figure 5C:
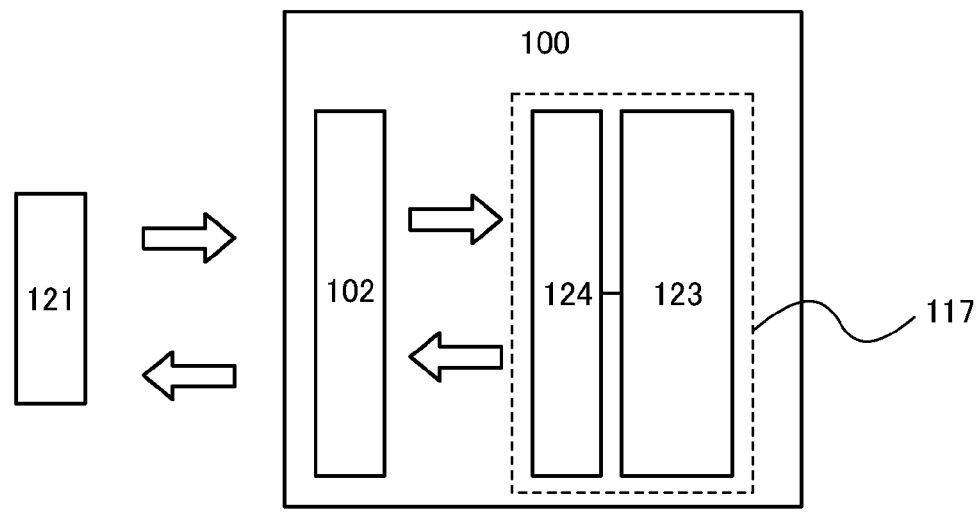

Next, operation of the semiconductor device 100 of this Embodiment will be described. FIG. 5C is an example of a block diagram illustrating a structure of the semiconductor device of this Embodiment.

The semiconductor device 100 shown in FIG. 5C includes the antenna coil 102 as a booster antenna, the semiconductor integrated circuit 123, and the semiconductor integrated circuit chip 117. The semiconductor integrated circuit chip 117 includes the antenna coil 124 as the on-chip antenna.

When the antenna coil 102 receives an electromagnetic wave transmitted from a reader/writer 121, an alternate current is generated in the antenna coil 102, whereby a magnetic field is generated around the antenna coil 102. Then, a loop-like portion of the antenna coil 102 is electromagnetically coupled with the antenna coil 124 having a loop-like shape, so that induced electromotive force is generated in the antenna coil 124.

The semiconductor integrated circuit 123 receives a signal or electric power from the reader/writer 121 by using the induced electromotive force. When current flows through the antenna coil 124 in accordance with a signal generated in the semiconductor integrated circuit 123 so that induced electromotive force is generated in the antenna coil 124, a signal can be transmitted to the reader/writer 121 over a reflected wave of an electric wave transmitted from the reader/writer 121.

Note that the antenna coil 102 mainly has a loop-like portion which is coupled electromagnetically with the antenna coil 124 and a portion which receives an electric wave from the reader/writer 121. The shape of the antenna coil 102 in the portion which mainly receives the electric wave from the reader/writer 121 may be any shape as long as the electric wave can be received.

In the semiconductor device of this Embodiment, the on-chip antenna is used and a signal or electric power can be exchanged between the booster antenna and the on-chip antenna without contact; therefore, unlike the case where an external antenna is connected to a semiconductor integrated circuit, the semiconductor integrated circuit and the antenna are less likely to be disconnected due to external force, and generation of initial failure in the connection can also be suppressed. In addition, since the booster antenna is used in this Embodiment, unlike the case where only the on-chip antenna is used, the advantage of an external antenna can also be offered. In other words, the area of the semiconductor integrated circuit does not significantly limit the size or shape of the on-chip antenna, the frequency band of electric waves which can be received is not limited, and the communication distance can be increased.

Although this Embodiment describes the antenna coil 102 as the booster antenna, the antenna coil 102 may be used as the on-chip antenna. In the case of using the antenna coil 102 as the on-chip antenna, the capacitor is provided in connection with the antenna coil 124 shown in FIG. 5A and FIG. 5B. The thickness of the base in the region which serves as the dielectric body of the capacitor may be reduced by using the roller 107 having the projection portion 108 or the laser beam.

The semiconductor integrated circuit can be directly formed over a flexible substrate. Alternatively, the semiconductor integrated circuit may be transferred from a formation substrate (for example, a glass substrate) to another substrate (for example, a plastic substrate).

In this Embodiment, the distance between the electrodes of the capacitor can be reduced by reducing the thickness of the dielectric body of the capacitor. By reducing the distance between the electrodes of the capacitor, the area of the electrode of the capacitor can be reduced. The reduction in the area of the electrode of the capacitor leads to the prevention of the suppression of response sensitivity and a response range of a semiconductor device.

This application is based on Japanese Patent Application serial no. 2010-139426 filed with Japan Patent Office on Jun. 18, 2010, the entire contents of which are hereby incorporated by reference.

What is claimed is:

1. An antenna comprising:
   a base including a first region and second region;
   an antenna coil provided over the base; and
   a capacitor including a first electrode and a second electrode, the first electrode provided over a first side of the base, and the second electrode provided over a second side of the base,
   wherein an entirety of the first region of the base overlaps with the antenna coil,
   wherein the second region of the base is included in the capacitor as a dielectric body, and
   wherein the second region of the base is thinner than the first region of the base.

2. The antenna according to claim 1,
   wherein the base is a film consisting of any one of polyethylene terephthalate, polyethylene naphthalate, polyether sulfone, and polyimide.

3. A semiconductor device comprising:
   a base including a first region and second region;
   a first antenna coil provided over the base;
   a capacitor including a first electrode and a second electrode, the first electrode provided over a first side of the base, and the second electrode provided over a second side of the base; and
   a chip including a semiconductor integrated circuit and a second antenna coil,
   wherein an entirety of the first region of the base overlaps with the first antenna coil,
   wherein the second region of the base is included in the capacitor as a dielectric body, and
   wherein the second region of the base is thinner than the first region of the base.

4. The semiconductor device according to claim 3,
wherein the base is a film consisting of any one of polyethylene terephthalate, polyethylene naphthalate, polyether sulfone, and polyimide.

5. A method of manufacturing an antenna according to claim 1, comprising the steps of:
  irradiating a first plane of the base having a first thickness by a laser beam to provide the second region of the base having a second thickness as the dielectric body of the capacitor and the first region of the base having the first thickness, the second thickness being smaller than the first thickness;
  forming an opening in the base;
  forming a first conductive material over the first plane of the second region with the second thickness, inside the opening, and over the first plane of the first region of the base with the first thickness;
  forming a second conductive material over a second plane opposite to the first plane; and
  heating the first conductive material and the second conductive material so as to form the antenna coil and the first and the second electrodes of the capacitor.

6. The method of manufacturing an antenna according to claim 5,
wherein the base is a film consisting of any one of polyethylene terephthalate, polyethylene naphthalate, polyether sulfone, and polyimide.

7. The method of manufacturing an antenna according to claim 5,
wherein each of the first conductive material and the second conductive material includes at least one of silver (Ag), gold (Au), copper (Cu), nickel (Ni), platinum (Pt), palladium (Pd), tantalum (Ta), molybdenum (Mo), and titanium (Ti).

8. The method of manufacturing an antenna according to claim 5,
wherein the opening is formed by a laser.

9. The method of manufacturing an antenna according to claim 5,
wherein the opening is formed by a knife.

10. The antenna according to claim 1,
wherein the base includes a depression portion.

11. The antenna according to claim 1,
wherein the base includes a depression portion, and
wherein the second region of the base overlaps with the depression portion.

12. The antenna according to claim 1,
wherein a thickness of the first region of the base is 1 μm or more and 300 μm or less.

13. The semiconductor device according to claim 3,
wherein the base includes a depression portion.

14. The semiconductor device according to claim 3,
wherein the base includes a depression portion, and
wherein the second region of the base overlaps with the depression portion.

15. The semiconductor device according to claim 3,
wherein a thickness of the first region of the base is 1 μm or more and 300 μm or less.

16. The semiconductor device according to claim 3,
wherein the chip overlaps with the first antenna coil.

17. The method of manufacturing an antenna according to claim 5,
wherein a depression portion is formed by irradiation with the laser beam to the first plane of the base.

* * * * *